United States Patent
Pan et al.

(10) Patent No.: US 9,917,707 B2
(45) Date of Patent: Mar. 13, 2018

(54) ADAPTIVE CASCADED EQUALIZATION CIRCUITS WITH CONFIGURABLE ROLL-UP FREQUENCY RESPONSE FOR SPECTRUM COMPENSATION

(71) Applicant: The Hong Kong University of Science and Technology, Hong Kong (CN)

(72) Inventors: Quan Pan, Hong Kong (CN); Chik Patrick Yue, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 14/848,875

(22) Filed: Sep. 9, 2015

(65) Prior Publication Data
US 2016/0080177 A1 Mar. 17, 2016

Related U.S. Application Data

(60) Provisional application No. 62/070,994, filed on Sep. 11, 2014.

(51) Int. Cl.
*H04L 25/03* (2006.01)

(52) U.S. Cl.
CPC .. *H04L 25/03019* (2013.01); *H04L 25/03057* (2013.01); *H04L 25/03159* (2013.01); *H04L 25/03885* (2013.01)

(58) Field of Classification Search
CPC ......... H04L 25/03885; H04L 25/03057; H04L 25/03019; H04L 25/03
See application file for complete search history.

(56) References Cited

U.S. PATENT DOCUMENTS

| | | |
|---|---|---|
| 6,958,663 B2 | 10/2005 | Eihama et al. |
| 7,668,236 B2 | 2/2010 | Lee |

(Continued)

FOREIGN PATENT DOCUMENTS

| | | |
|---|---|---|
| EP | 1 343 218 A2 | 9/2003 |
| EP | 1 622 285 A3 | 1/2010 |
| JP | H08250955 A | 9/1996 |

OTHER PUBLICATIONS

Ruifeng Sun, "A Low-Power 20-Gb/s Continuous-Time Adaptive Passive Equalizer", Carnegie Mellon University, PHD Thesis, Dec. 2005.*

(Continued)

*Primary Examiner* — Aristocratis Fotakis
(74) *Attorney, Agent, or Firm* — Leydig, Voit & Mayer, Ltd.

(57) ABSTRACT

The present disclosure provides adaptive cascaded equalization circuits for frequency spectrum compensation. The cascaded equalization are formed in circuit configurations to achieve configurable roll-up frequency responses to compensate for the loss of signal channels in the wire-line or optical communications, particularly but not exclusively, for the loss of signal trace in the wire-line communications, and photodetectors used in the optical communications. These cascaded equalization circuits include two or more stages of equalizers. The peaking frequencies of each stage are set to be different from each other, so that the overall frequency response characteristic has a unique frequency response with a roll-up slope. The equalization function is automatically tuned by an adaptive feedback control loop.

18 Claims, 8 Drawing Sheets

(56) References Cited

U.S. PATENT DOCUMENTS

| | | | |
|---|---|---|---|
| 7,778,323 B1* | 8/2010 | Nodenot | H04L 25/03038 375/233 |
| 8,183,921 B1 | 5/2012 | Narayan et al. | |
| 8,798,484 B2 | 8/2014 | Proesel et al. | |
| 8,810,319 B1* | 8/2014 | Chan | H03F 1/42 330/253 |
| 9,020,364 B2 | 4/2015 | Xie et al. | |
| 9,172,566 B1* | 10/2015 | Li | H04L 25/03885 |
| 9,397,623 B1* | 7/2016 | Lacroix | H03F 3/193 |
| 9,537,681 B1* | 1/2017 | Chan | H04L 25/03057 |
| 2004/0005001 A1* | 1/2004 | Jones | H03G 5/005 375/232 |
| 2006/0013295 A1* | 1/2006 | Kuijk | H04B 3/143 375/229 |
| 2006/0140262 A1* | 6/2006 | Kuijk | H04L 25/03885 375/232 |
| 2006/0182171 A1* | 8/2006 | Kuijk | H04B 3/141 375/229 |
| 2008/0247452 A1* | 10/2008 | Lee | H04L 25/03885 375/232 |
| 2013/0188965 A1* | 7/2013 | Afriat | H04B 10/60 398/136 |
| 2013/0285726 A1* | 10/2013 | Roytman | H03K 5/26 327/175 |
| 2014/0185661 A1* | 7/2014 | Chang | H04L 27/01 375/232 |

OTHER PUBLICATIONS

Lee, D., et al., "An 8.5-Gb/s Fully Integrated CMOS Optoelectronic Receiver Using Slop-Detection Adaptive Equalizer", *IEEE Journal of Solid-State Circuits*, vol. 45, No. 12, pp. 2861-2873 (Dec. 2010).

Proesel, J.E., et al., "A 20-Gb/s 0.66-pJ/bit Serial Receiver with 2-Stage Continuous Time Linear Equalizer and 1-Tap Decision Feedback Equalizer in 45nm SOI CMOS", *2011 Symposium on VLSI Circuits Digest Technical Paper*, pp. 206-207, (Jun. 2011).

Pan, Quan, et al., "A 41-mW 30-Gb/s CMOS Optical Receiver with Digitally-Tunable Cascaded Equalization", in *Proc. European Solid-State Circuits Conference [ESSCIRC]*, Sep. 2014 (4 pages).

Shin, D., et al., "A 1-mW 12-Gb/s Continuous-Time Adaptive Passive Equalizer in 90-nm CMOS," in *IEEE Custom Integrated Circuits Conference (CICC)*, pp. 117-120, Sep. 2009.

Aroca, R.A., et al., "A 2.4 $V_{pp}$ 60-Gb/s CMOS Driver with Digitally Variable Amplitude and Re-emphasis Control at Multiple Peaking Frequencies", *IEEE Journal of Solid State Circuits*, vol. 46, No. 10, pp. 2226-2239, Oct. 2011.

Gondi, S., et al., "Equalization and Clock and Data Recovery Techniques for 10-Gb/s CMOS Serial-Link Receivers", *IEEE Journal of Solid-State Circuits*, vol. 42, No. 9, pp. 1999-2011, Sep. 2007.

Pan, Quan, et al., "A 30-Gb/s 1.37-pJ/b CMOS Receiver for Optical Interconnects", *Journal of Lightwave Technology*, vol. 33, No. 4., pp. 778-786, Feb. 15, 2015.

El-Nozahi, M., et al., "A Millimeter-Wave (23-32 GHz) Wideband BiCMOS Low-Noise Amplifier", *IEEE Journal of Solid-State Circuits*, vol. 45, No. 2, pp. 289-299, Feb. 2010.

\* cited by examiner

ADAPTIVE CASCADED EQUALIZATION CIRCUITS WITH CONFIGURABLE ROLL-UP FREQUENCY RESPONSE FOR SPECTRUM COMPENSATION

CROSS-REFERENCE TO RELATED APPLICATIONS

This patent application claims the benefit of U.S. Provisional Patent Application No. 62/070,994, filed Sep. 11, 2014, which is incorporated herein by reference.

BACKGROUND

In present-day data communications systems, data transmission with a high data rate suffers from limited bandwidth and significant loss stemming from properties of the signal channels. For example, conventional copper-based electrical interconnects have been shown sufficient for applications with data rate below 10 Gb/s. However, for data rates beyond 10 Gb/s, these electrical interconnects perform very poorly. To overcome these limitations, fiber-optic interconnects have been used to handle larger data volume and higher data rates compared to conventional electrical interconnects. Fiber-optic interconnects have shown improvement in terms of weight, energy efficiency, channel bandwidth, crosstalk, and electromagnetic interference.

Since circuits and devices made with complementary metal oxide semiconductor (CMOS) technology are still utilized at various parts in high data rate transmission systems, switching to fiber-optic interconnects only changes which part of the system is the transmission rate bottleneck. Optical circuits still need to be interfaced with electrical circuits. More advanced technologies like silicon-on-insulator CMOS have been shown to provide performance improvements, but the expense associated with advanced technologies can be prohibitive for large scale mass production.

SUMMARY

An exemplary embodiment provides a frequency compensation technique for mitigating the effects of a lossy signal channel. The frequency compensation technique in this disclosure involves determining the frequency response of the lossy channel and connecting the lossy channel to at least two equalizers in the signal path. These equalizers are connected in series to one another. Each equalizer of the at least two equalizers has a design frequency that differs from the others. The overall frequency response of the at least two equalizers connected in series to each other has a roll-up characteristic. The roll-up frequency response compensates for the losses in the lossy signal channel. The lossy signal channel in this case may be a wire-line channel or photodetectors used in optical cables.

In another exemplary embodiment, a high speed data transmission system includes a lossy channel and at least two equalizers connected in series. The lossy channel is connected to the at least two equalizers, and the lossy channel has a frequency response with a roll-off characteristic. The at least two equalizers in the high speed data transmission system have design frequencies that differ from one another and an overall frequency response with a roll-up characteristic. In addition, an adaptive feedback control loop may be provided in the system to automatically adjust the frequencies of each of the at least two equalizers connected in series.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
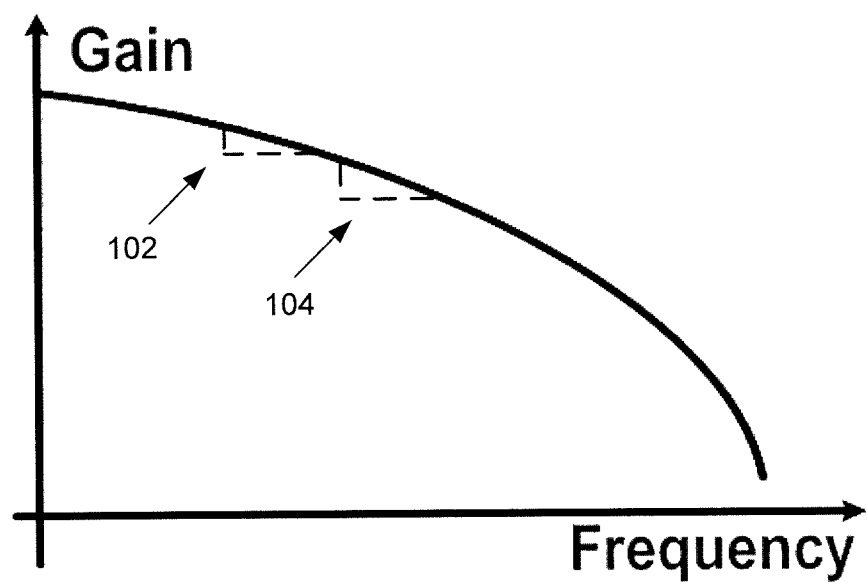
FIG. 1 depicts an exemplary illustration of the frequency response of a lossy channel.

High data rate transmission suffers from limited channel bandwidth and significant channel losses. In order to mitigate these adverse effects, channel bandwidth and channel losses have been improved by introducing equalizers in the signal path. Equalizers used for mitigating the adverse effects include continuous-time linear equalizer (CTLE), decision feedback equalizer (DFE), feed forward equalizer (FFE), etc. None of these conventional equalizer designs have been shown to adequately address the reduced bandwidth and increased losses in the channel. These conventional equalizers have been designed without realizing that, for high data rate channels, the losses of signal channels in wire-line or optical communications have different roll-off frequency responses. These roll-offs are not just a typical number, for example, these roll-offs do not obey a constant roll-off like 20 dB/decade.

Exemplary embodiments of this disclosure provide a method of combating the effects of these variable channel roll-offs, since currently available equalizers are poor at complementarily compensating for the channel signal losses.

Specifically, certain exemplary embodiments provide adaptive cascaded equalization circuits for frequency spectrum compensation. The cascaded equalization is formed in circuit configurations that achieve configurable roll-up frequency responses to compensate for the loss associated with signal channels in wire-line or optical communications, particularly but not exclusively, for the loss of signal trace in the wire-line communications, and photodetectors used in the optical communications. These cascaded equalization circuits include two or more stages of equalizers. The peaking frequencies of each stage are set to be different from each other, so that the overall frequency response characteristic has a unique frequency response with a roll-up slope. The equalization function is automatically tuned by an adaptive feedback control loop.

Exemplary embodiments further provide a roll-up frequency compensation for a roll-off lossy signal channel. The cascaded equalization is formed in circuit configurations to achieve roll-up frequency responses to compensate for the loss of signal channels in the wire-line or optical communications, particularly but not exclusively, for the loss of signal trace in the wire-line communications, and photodetectors used in the optical communications. This cascaded equalization topology includes two or more stages of equalizers. The peaking frequencies of each stage are set to be different from each other, so that the overall frequency response characteristic has a unique frequency response with a roll-up slope. The equalization function is automatically tuned by an adaptive feedback control loop. One exemplary implementation method is by comparing the signal power of a high-frequency part with the signal power of a low-frequency part. Another exemplary implementation method is by comparing the signal power of an all-pass part with the signal power of a low-frequency part.

These exemplary embodiments may find suitable applications in signal communication. These applications include Universal Serial Bus (USB) 3.0, Ethernet communication (including 10 Gb to 100 Gb), fiber optic communication, etc. These embodiments are targeted to reduce bit error rate (BER) of data transmission in the aforementioned applications. These exemplary embodiments also reduce signal distortion and increase overall signal to noise ratio of signals in communication channels. Certain embodiments of the disclosure provide a system to reduce the effects of a lossy channel by increasing channel bandwidth and reducing channel noise at a low power budget. These embodiments that are conducive to low power operation may be utilized in low voltage applications without a large drop-off in performance. Exemplary embodiments thus provide for, among other advantages, low power requirements and real-time equalization.

FIG. 1 depicts an exemplary illustration of the frequency response of a lossy channel. The vertical axis shows the gain of the channel in decibels (dB), while the horizontal axis shows the frequency of the channel in log-scale. The lossy channel can be a signal trace in a conventional electrical interconnect for wire-line communications, a photodetector in optical communication, etc. Different channels will exhibit different frequency response profiles. For example, a photodiode used for optical communications will exhibit a different channel profile compared to a conventional copper-based electrical interconnect. FIG. 1 shows that the roll-off slope is variable at different frequency settings. Different channels have different roll-off slopes. Even within the same channel, the roll-off slope could increase as frequency increases. This is evident with the comparison of the slope designated by triangle 102 and that designated by triangle 104. Triangle 104 indicates a larger slope compared to triangle 102. In recognizing this property for the channel, a method to compensate for channel effects is developed.

Figure 2A:
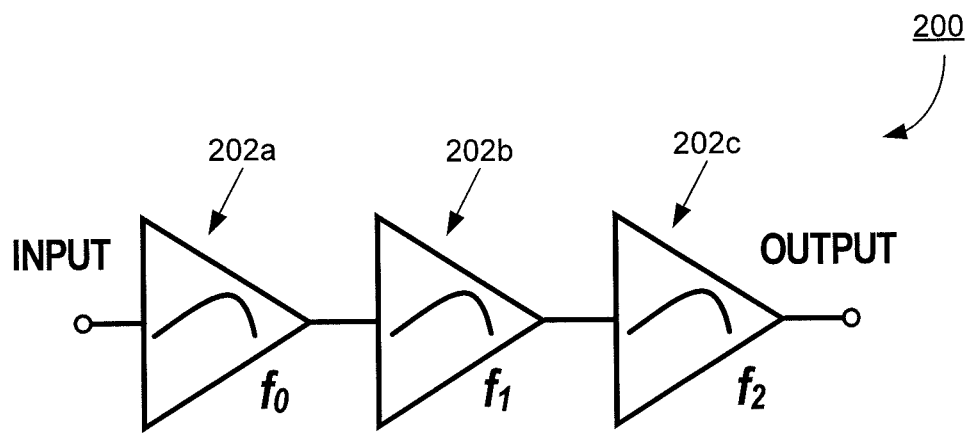
FIGS. 2A-2B depict exemplary cascaded equalization circuits according to certain embodiments of the disclosure used to compensate for a lossy channel.

FIG. 2A is an exemplary schematic of a cascaded equalization circuit 200 to compensate for a lossy channel according to various embodiments of the disclosure. FIG. 2A shows multiple cascaded stages of equalization circuits labeled 202a, 202b, and 202c. In certain embodiments, the three stage equalization circuit is composed of equalizers that have peaking frequencies of each equalization stage set to be different from each other. For example, the frequency of 202a, presented as $f_0$, is designed to be 20 GHz; the frequency of 202b, presented as $f_1$, is designed to be 12 GHz; and the frequency of 202c, presented as $f_2$, is designed to be 5 GHz. In the scheme provided in FIG. 2A, the order of the peaking frequencies can be adjusted for different applications. For example, after measuring a specific lossy channel, the frequency of each stage may be tuned for the specific lossy channel to match the roll-off properties of that channel.

In other exemplary embodiments, the peaking frequencies of each equalization stage are set in an ascending order instead of a descending order. For example, $f_0$ may be designed to be 5 GHz, $f_1$ designed to be 12 GHz, and $f_2$ designed to be 20 GHz. The decision on whether to choose an ascending or descending order is dependent on the signal strength of the input signal and on the target application. When the input signal is substantially weak, especially at high frequencies, a descending order may be more appropriate. However, if the input signal is relatively strong, for example, in wire-line communication, an ascending order may be adopted.

Figure 2B:
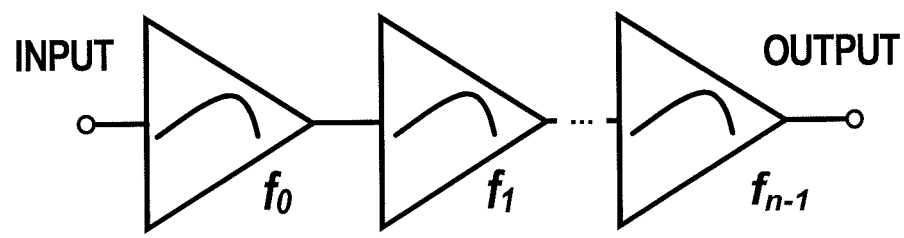

A three-stage scheme is shown in FIG. 2A, but this scheme may be expanded to an n-stage scheme as provided in FIG. 2B while maintaining low power and real-time equalization advantages. In certain exemplary configurations, signal from the lossy channel serves as the input to the cascaded equalization circuit 200. In other exemplary configurations, the output of the cascaded equalization circuits serves as the input to the lossy channel. After propagating through several cascaded stages, a signal that is corrected for channel losses is provided at either the output of the cascaded equalization circuit 200 or at the output of the lossy channel, depending on the series connection between the lossy channel and the cascaded equalization circuit 200.

Referring to FIG. 2B, in certain embodiments, multiple stages may be designed to have the same frequency response in order to effect a higher order frequency response. This would be advantageous in the n-stage scheme in order to alleviate design constraints placed on achieving a steep slope in one stage. For example, the design effort in a 3-stage cascaded equalization circuit with design frequencies $f_0$, $f_1$, and $f_2$ may be relaxed by adding two more stages with frequency responses $f_0$ and $f_1$ in order to further tune the desired frequency response. The result would be a 5-stage cascaded equalization circuit.

Figure 3A:
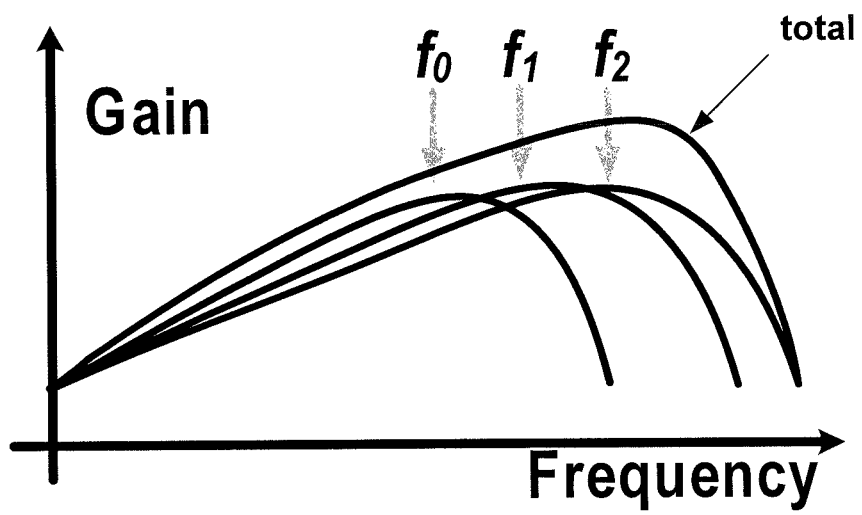
FIG. 3A depicts an exemplary frequency response of a 3-stage cascaded equalization circuit.

FIG. 3A depicts an exemplary frequency response of the cascaded equalization circuit 200 according to certain embodiments of the disclosure. In FIG. 3A, the different frequency responses for each stage are depicted and labeled accordingly, and the total frequency response for all three stages is provided. In certain instances, each equalization circuit introduces its zeros and poles to the overall frequency response. Therefore, the total roll-up frequency response is achieved by interpolating the poles and zeros of each stage in order to complementarily compensate for the loss of the signal channel provided in FIG. 1A. An exemplary design is provided further below with the description of FIG. 6.

Figure 3B:
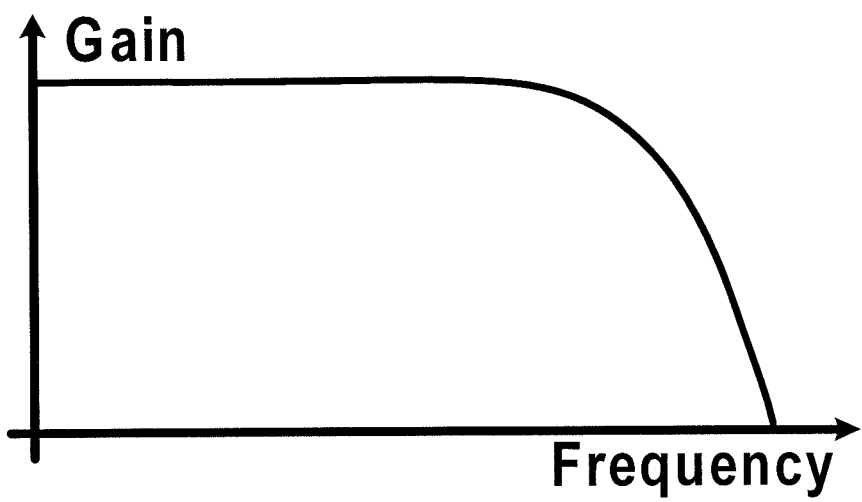
FIG. 3B depicts an exemplary frequency response of a transmitted signal over a combination of a lossy channel and a 3-stage cascaded equalization circuit according to certain embodiments of the disclosure.

FIG. 3B depicts an exemplary frequency response of the combination of a lossy channel as provided in FIG. 1 and the cascaded equalization circuit 200 in accordance with certain embodiments of the disclosure. Since the lossy channel in FIG. 1 attenuates higher frequency components of a signal, a complementary frequency response is designed to have a total response provided in FIG. 3A to counteract the attenuation in the lossy channel. Due to the combination of the lossy channel and the cascaded equalization circuit 200, a flat frequency response may be obtained in the passband. The response obtained in FIG. 3B is shown to exhibit a higher bandwidth compared to that of FIG. 1. Due to a constant gain in the frequency of interest, higher frequency components within the bandwidth of the combination will not be filtered out as the case in FIG. 1. Additionally, since FIG. 1 does not have a constant roll-off slope, the cascaded equalization circuit 200 is able to be used to design a roll-up that substantially matches the roll-off of FIG. 1.

Figure 4:
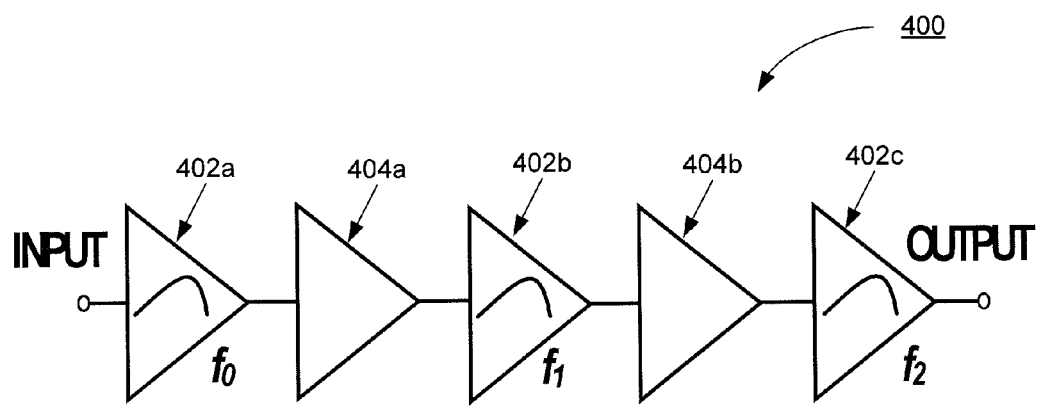
FIG. 4 depicts an exemplary embodiment of a cascaded equalization circuit with gain stages.

FIG. 4 depicts an exemplary embodiment of a cascaded equalization circuit 400 with gain stages that compensate for lossy channels in accordance with certain embodiments of the disclosure. The cascaded equalization circuit 400 differs from the cascaded equalization circuit 200 due to the introduction of gain stages 404a and 404b. The gain stages are introduced in this configuration in order to compensate for DC gain losses that may occur due to the cascaded equalization stages. The stages 402a, 402b, and 402c are analogous to 202a, 202b, and 202c, since these stages are equalization circuits. The gain stages provided in the exemplary embodiment of FIG. 4 should have bandwidth high enough to avoid attenuating the input signal. Therefore, the gain stages should not limit the bandwidth of the cascaded equalization circuit 400 and should be designed to encompass all frequency ranges of interest in the channel. In certain embodiments, each gain stage is designed to encompass the frequency range of the output signal of its previous stage instead of all frequency ranges of interest in the channel. This design decision may be made to alleviate design effort of each gain stage.

The gain stages may be designed to provide different gains depending on the desired application. The design decisions may depend on overall gain required, or just to compensate for gain losses introduced by the equalization circuits. For example, the gain of 404a may be designed to match the loss of 402a, and the gain of 404b may be designed to match the loss of 402b.

FIG. 4 depicts an exemplary configuration, but other configurations are possible. For example, stage 404b may be removed, and 404a would be only gain stage. In another example, stage 404a may be removed, and 404b may be the only gain stage in the cascade. The adopted configuration depends on the necessary gain requirements of the desired application. Additionally, FIG. 4 provides a configuration with three equalization circuits 402a, 402b, and 402c chained with two gain stages 404a and 404b. This configuration may be extended to an n-stage configuration where n equalization circuits may be chained with n−1 gain stages. In certain embodiments, an n-stage configuration has less than n−1 gain stages.

Figure 5A:
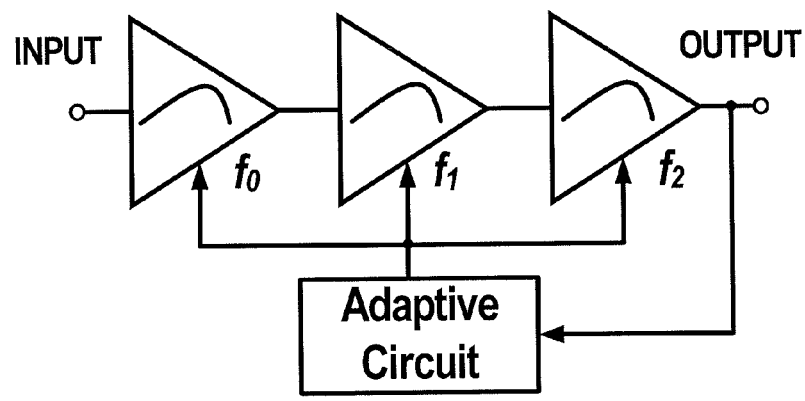
FIGS. 5A-5B depict exemplary illustrations of cascaded equalization circuits connected to adaptive circuits according to certain embodiments.

FIG. 5A depicts an exemplary illustration of a cascaded equalization circuit connected to an adaptive circuit according to certain embodiments. The adaptive circuit is configured to detect signal integrity (e.g., power spectral density) at the output of the cascaded equalization circuit, and then provide a feedback control signal to automatically tune the cascaded equalizers. In certain exemplary embodiments, signal integrity corresponds to power spectral density of a random bit stream through the channel-cascaded equalization system. This may be measured by performing a frequency scan over a frequency band of interest and integrating the signal power within the frequency band of interest. In certain exemplary embodiments, the adaptive circuit tunes the cascaded equalizers by varying one or more control voltages to influence at least one of a resistance, a capacitance, or an inductance. In other exemplary embodiments, the adaptive circuit varies one or more control currents to influence at least one of a resistance, a capacitance, or an inductance.

Figure 5B:
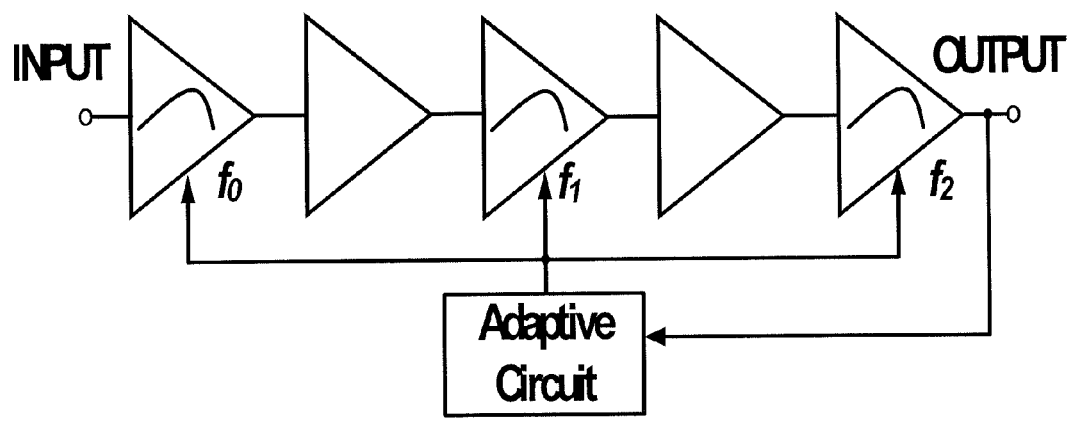

FIG. 5B is an exemplary illustration of a cascaded equalization circuit with gain stages connected to an adaptive circuit according to certain embodiments. The adaptive circuit serves a similar role as in FIG. 5A. The expected response may be tuned in real-time depending on the signal integrity at the output.

Figure 6:
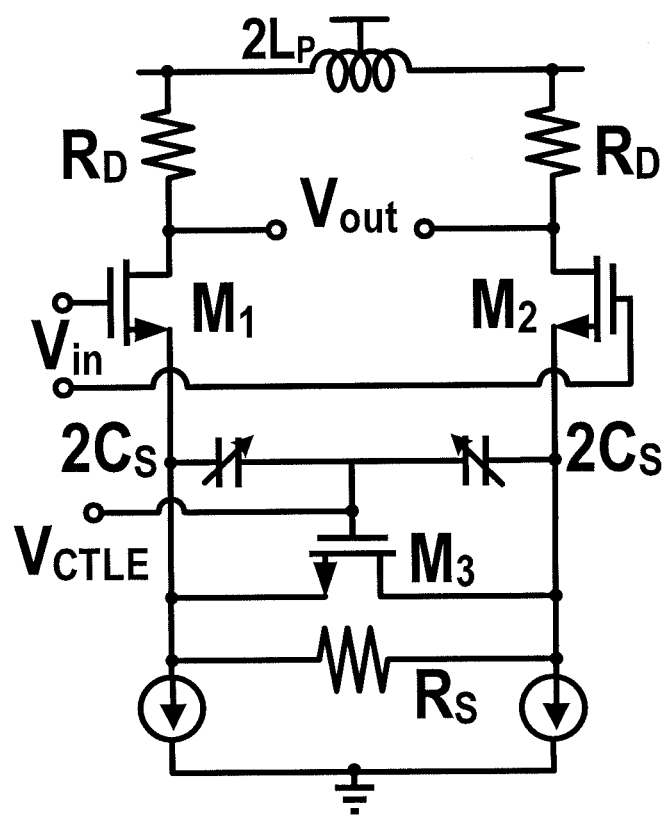
FIG. 6 depicts an exemplary embodiment of an equalization circuit.

FIG. 6 depicts an exemplary circuit implementation of an equalization circuit or an equalizer that may be used in certain embodiments of the disclosure. The equalizer in FIG. 6, dubbed a continuous-time linear equalizer (CTLE), has components of a differential source degenerated amplifier. The circuit implementation in FIG. 6 accomplishes resistive degeneration with the $R_S$ resistor and capacitive degeneration with the two $2C_S$ capacitors. In certain embodiments, by tuning the source degeneration RC network, the zeros and poles of the circuit are allocated to different frequencies. The CTLE in FIG. 6 has two inputs, $V_{in}$ and $V_{CTLE}$. $V_{in}$ is the input signal to the CTLE that is transformed by the CTLE to obtain an output signal $V_{out}$. $V_{CTLE}$ is a control signal used to influence the values of the degenerated resistor and capacitors in the CTLE. The exemplary circuit of FIG. 6 may be chained in multiple stages to realize a frequency response with a controllable slope in order to accommodate different channel losses.

The transfer function for the CTLE provided in FIG. 6 can be represented as:

$$\frac{V_{out}}{V_{in}}(S) = \frac{g_{m1}R_D}{1 + \frac{g_{m1}R_S}{2}} \frac{\left(1 + \frac{s}{\omega_{z1}}\right)\left(1 + \frac{s}{\omega_{z2}}\right)}{\left(1 + \frac{s}{\omega_{p1}}\right)\left(1 + \frac{2\zeta s}{\omega_n} + \frac{s^2}{\omega_n^2}\right)} \quad \text{(Eqn. 1)}$$

where $\omega_{z1} = 1/(R_S C_S)$, $\omega_{p1} = \left(1 + \frac{g_{m1}R_D}{2}\right)/(R_S C_S)$, $\omega_{z2} = 2\zeta\omega_n$, $\zeta = \left(\frac{R_D}{2}\right)\sqrt{C_L/L_P}$, and $\omega_n = 1/\sqrt{C_L L_P}$.

In determining Eqn. 1, the transconductance ($g_m$) of transistors $M_1$ and $M_2$ are assumed to be equal to one another and is represented as $g_{m1}$. $R_S$ and $R_D$ represent the source and drain resistances, respectively, as depicted in FIG. 6. $C_S$, $C_L$, and $L_P$ are source capacitance, load capacitance (not shown in FIG. 6), and pull-up inductance, respectively. $\omega_{z1}$ and $\omega_{z2}$ represent the first and second zeros, respectively. $\omega_{p1}$ represents a first pole, and $\omega_n$ represents complex poles.

From the transfer function, the gain, poles, and zeros can be written as transistor, capacitor, resistor, and inductor properties. By choosing appropriate values, this topology can boost gain and compensate for phase at higher frequencies by cancelling the first pole with the second zero. Additionally, since the values of the poles and zeros are influenced by properties of circuit elements or components, choosing appropriate values for these components may allow interpolating poles and zeros of multiple stages in order to complementarily match the roll-off slope of a lossy channel.

FIG. 6 is provided as an exemplary embodiment of an equalizer circuit that may be used in accordance with some embodiments of the disclosure. Other equalizer topologies may be utilized as well, for example, instead of a CTLE, a DFE, or an FFE may be used. In some embodiments, the transfer function of the DFE or FFE may be obtained to identify poles and zeros in order to cascade multiple stages of the DFE or FFE to substantially match a roll-off slope of a lossy channel.

Figure 7A:
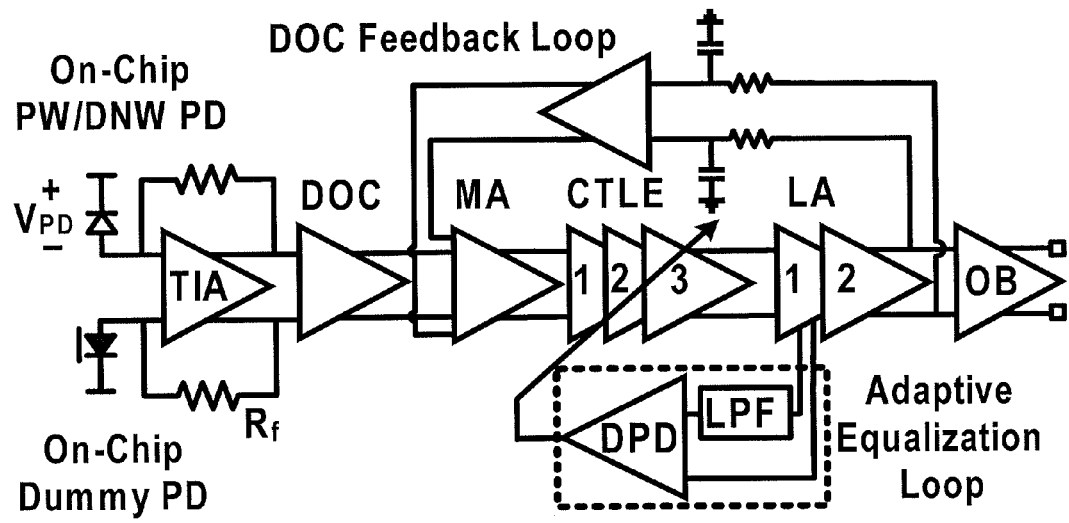
FIG. 7A depicts a sample receiver architecture according to certain embodiments.

FIG. 7A provides an exemplary architecture of an optical receiver in accordance with certain embodiments of the disclosure. FIG. 7A comprises a photodetector with a voltage designated as $V_{PD}$, a transimpedance amplifier (TIA) with a feedback resistor $R_f$, a dc offset cancellation (DOC) block, a DOC Feedback Loop, a main amplifier (MA), a CTLE cascade, two limiting amplifier (LA), and one output buffer (OB). The adaptive equalization loop (AEL) is used in conjunction with the cascaded CTLE in accordance with certain embodiments of the disclosure.

Figure 7B:
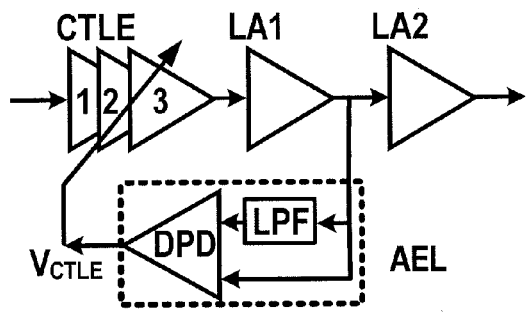
FIG. 7B depicts a sample circuit with adaptive feedback according to certain embodiments of the disclosure.

FIG. 7B provides an exemplary schematic according to certain embodiments of the disclosure that are analogous to the architecture in FIG. 5A and FIG. 5B. The CTLE circuit embodiment depicted in FIG. 6 may be used in a three-stage configuration provided in FIG. 7B. Additionally two amplifiers, LA1 and LA2 are provided for signal amplification. The output signal of LA1 serves as the feedback input to the adaptive circuitry composed of a low-pass filter (LPF) and a differential power detector (DPD). The output of the DPD is used to generate a control voltage $V_{CTLE}$ for adjusting the three stage cascaded equalization circuit. In certain embodiments, multiple control signals are generated to individually control each stage of the three-stage equalization circuit. In other instances, only one of the three stages receives the control signal and is able to be adjusted.

Figure 8:
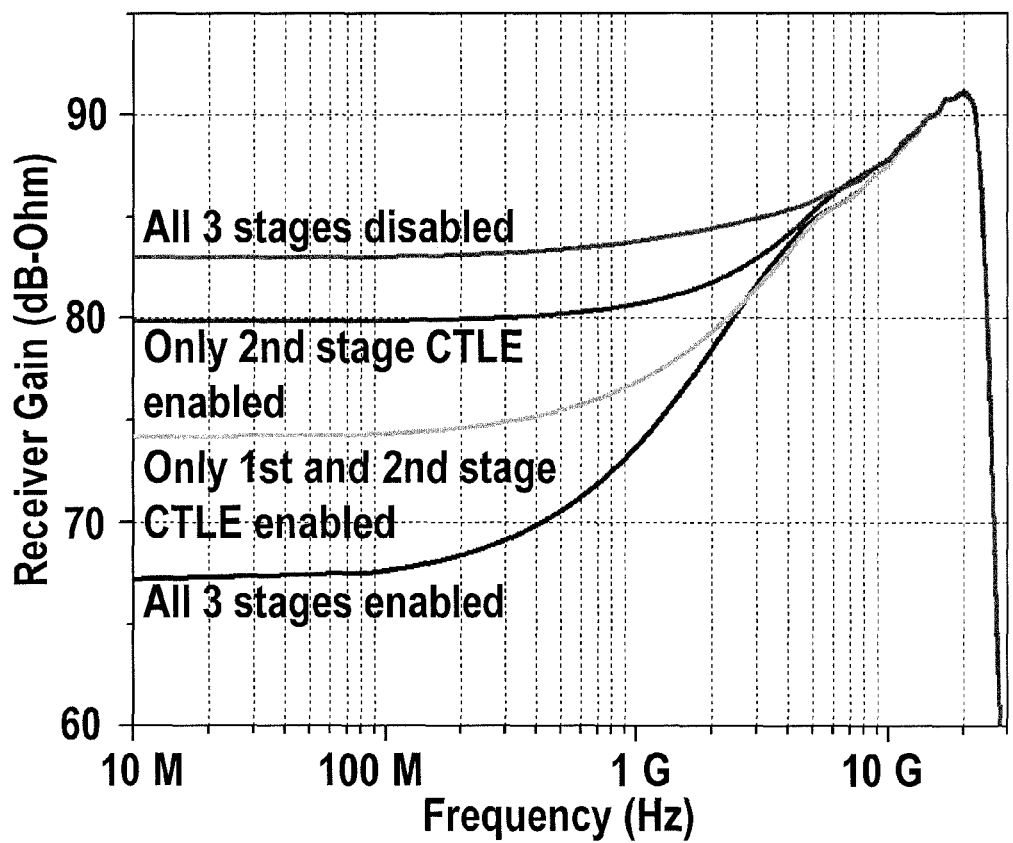
FIG. 8 depicts an exemplary frequency response of a 3-stage cascaded equalization circuit according to certain embodiments of the disclosure.

FIG. 8 provides an exemplary frequency response of a three-stage cascaded equalization circuit according to certain embodiments of the disclosure where stages of a three-stage cascaded equalization circuit may be deactivated. In certain embodiments, the equalization is deactivated or activated by the equalization control voltage $V_{CTLE}$ as provided in FIGS. 6 and 7. When the control voltage is high, the resistance of $M_3$ reduces substantially, effectively shorting $R_S$ and $C_S$. The effective resistance can be assumed to be zero, and the effective capacitance can be assumed to be very small. In this situation, there is no equalization. But when the control voltage decreases, the effective resistance and capacitance will become larger, and thus will change the zeros and poles of the equalization circuits, and equalization will be enabled accordingly.

In the exemplary behavior of FIG. 8, when all three stages are deactivated, the gain of the cascaded equalization circuit is initially flat and slowly rises to a peak at around 20 GHz. When only one stage, in this case Stage 2, is activated, the frequency response follows a similar profile but with a lower starting gain. When two stages are activated, in this case Stages 1 and 2, the initial gain further decreases, and the rise to the peak starts earlier. When all three stages are activated, then the initial gain is at its lowest point and the slope between the peak and the initial gain is larger. This exemplary embodiment provides that the roll-up slope to the peak at around 20 GHz may be tuned by deactivating different stages of the cascaded equalization circuit. This provides another mode and method of dealing with channel changes, especially in cases where the channel changes over time. For example, due to environmental variables, the conductive properties of a copper wire may change over time.

In certain embodiments, deactivating one stage involves frequency tuning to eliminate zeros in a circuit. In other embodiments, switches may be used to bypass one stage for another.

Further exemplary implementations of the described principles, and results relating thereto, may be found in the publication Q. Pan et al., "A 41-mW 30-Gb/s CMOS Optical Receiver with Digitally-Tunable Cascaded Equalization," in Proc. European Solid-State Circuits Conference (ESS-CIRC), September 2014, which is incorporated herein by reference in its entirety.

Exemplary embodiments of the disclosure include a cascaded equalizer with at least two stages connected in a sequence. The peaking frequency of each stage may be different from each other. The order of the peaking frequencies is flexible to accommodate different designs. An exemplary overall frequency response has a roll-up frequency response. The overall frequency response is used to compensate for the loss due to signal channels in a complementary manner. Multiple gain stages may be included to compensate for the low frequency gain loss due to the equalization stages. Additionally, an adaptive circuit may be included to auto-tune the equalization function based on a negative feedback mechanism.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for reducing channel loss in high data rate transmission, the device comprising:
at least two equalizers connected in series;
at least one gain stage interspersed between two consecutive equalizers of the at least two equalizers, the at least one gain stage being configured to compensate for gain loss between equalization stages corresponding to the at least two equalizers; and
an adaptive feedback circuit, configured to provide an adaptive feedback control loop which automatically tunes an equalization function associated with the at least two equalizers and the at least one gain stage, wherein one end of the adaptive circuit is connected to an output of the at least two equalizers and the other end is connected to a control input that adjusts each of the at least two equalizers;
wherein automatically tuning the equalization function includes setting the peaking frequencies of each equalization stage to be different from one another, and an overall frequency response of the equalization function has a roll-up characteristic configured to compensate for channel loss.

2. The device according to claim 1, wherein each of the at least two equalizers is independently enabled and disabled.

3. The device according to claim 1, wherein the adaptive feedback circuit determines a control signal to the control input by comparing a high-frequency signal output of the at least two equalizer with a low-frequency signal output of the at least two equalizers.

4. The device according to claim 1, wherein the adaptive feedback circuit comprises a low pass filter and a differential power detector, the differential power detector being configured to compare the output of the at least two equalizers with an output of the low pass filter, and the low pass filter being configured to filter the output of the at least two equalizers.

5. A high speed data transmission system comprising:
a lossy channel;
at least two equalizers; at least one gain stage interspersed between two consecutive equalizers of the at least two equalizers, the at least one gain stage being configured to compensate for gain loss between equalization stages corresponding to the equalizers; and
an adaptive feedback circuit, configured to provide an adaptive feedback control loop which automatically tunes an equalization function associated with the at least two equalizers and the at least one gain stage, wherein one end of the adaptive circuit is connected to an output of the at least two equalizers and the other end is connected to a control input that adjusts each of the at last two equalizers, and wherein the adaptive feedback circuit comprises a low pass filter and a differential power detector, the differential power detector being configured to compare the output of the at least two equalizers with an output of the low pass filter to determine the control input, and the low pass filter being configured to filter the output of the at leas two equalizers;
wherein the lossy channel and the at least two equalizers a connected in series;
wherein the lossy channel has a frequency response with a roll-off characteristic;
wherein automatically tuning the equalization function includes setting the peaking frequencies of each equalizer to be different from one another, and an overall frequency response of the equalization function ahs a roll-up characteristic configured to compensate for channel loss.

6. The high speed data transmission system of claim 5, wherein the at least two equalizers are continuous-time linear equalizers.

7. The high speed data transmission system of claim 5, wherein the peaking frequencies of each of the at least two equalizers is determined from the roll-off characteristic of the lossy channel.

8. The high speed data transmission system of claim 5, wherein each of the at least two equalizers is independently enabled and disabled.

9. The high speed data transmission system of claim 5, wherein the lossy channel is an electrical interconnect.

10. The high speed data transmission system of claim 5, wherein the lossy channel is a fiber optic interconnect with a photodetector.

11. A method of reducing channel loss in high data rate transmission, the method comprising:
determining a frequency response of a lossy channel;
connecting the lossy channel to at least two equalizers in a signal path;
connecting at least one gain stage in the signal path, wherein the at least one gain stage is interspersed between two consecutive equalizers of the at least two equalizers, the least one gain stage being configured to compensate for gain loss between equalization stages corresponding to the equalizers; and
connecting an adaptive feedback circuit to the signal path, wherein the adaptive feedback circuit is configured to provide an adaptive feedback control loop which automatically tunes an equalization function associated with the at least two equalizers and the at least one gain stage, wherein one end of the adaptive circuit is connected to an output of the signal path and the other end is connected to a control input that adjusts each of the at least two equalizers;
wherein automatically tuning the equalization function includes setting the peaking frequencies of each equalization stage to be different from one another, and an overall frequency response of the equalization function has a roll-up characteristic configured to compensate for channel loss.

12. The method according to claim 11, wherein the at least two equalizers are continuous-time linear equalizers.

13. The method according to claim 11, wherein the peaking frequencies of each of the at least two equalizers is determined from a roll-off characteristic of the lossy channel.

14. The method according to claim 11, wherein each of the at least two equalizers is independently enabled and disabled.

15. The method according to claim 11, wherein the lossy channel is an electrical interconnect.

16. The method according to claim 11, wherein the adaptive feedback circuit determines a control signal to the control input by comparing a high-frequency signal output of the at least two equalizers with a low-frequency signal output of the at least two equalizers.

17. The method according to claim 11, wherein the lossy channel is a fiber optic interconnect with a photodetector.

18. The method according to claim 11, wherein the adaptive feedback circuit comprises a low pass filer and a differential power detector, the differential power detector configured to compare the output of the signal path with an output of the low pass filter to determine the control put, and the low pass filter configured to filer the output of the signal path.

* * * * *